United States Patent
Lee et al.

(10) Patent No.: US 7,310,128 B2
(45) Date of Patent: Dec. 18, 2007

(54) MANUFACTURING LINE OF LIQUID CRYSTAL DISPLAY DEVICE AND FABRICATING METHOD THEREOF

(75) Inventors: Sang Seok Lee, Taegu-Kwangyokshi (KR); Myoung Gu Kang, Kumi-shi (KR); Jong Han Kim, Taegu-kwangyokshi (KR); Heung Sun Kim, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 308 days.

(21) Appl. No.: 10/963,640

(22) Filed: Oct. 14, 2004

(65) Prior Publication Data

US 2005/0140921 A1  Jun. 30, 2005

(30) Foreign Application Priority Data

Dec. 26, 2003  (KR) .................. 10-2003-0097617

(51) Int. Cl.
*G02F 1/13* (2006.01)
*G02F 1/1333* (2006.01)

(52) U.S. Cl. ................ 349/192; 349/187; 349/161; 349/158

(58) Field of Classification Search ............... 349/187, 349/161, 158, 192
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,170,195 A * | 12/1992 | Akiyama et al. | 353/54 |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |

(Continued)

FOREIGN PATENT DOCUMENTS

CN  1439921 A1  9/2003

(Continued)

*Primary Examiner*—Mike Qi
(74) *Attorney, Agent, or Firm*—McKenna Long & Aldridge LLP (57) ABSTRACT

The present invention provides a manufacturing line of a liquid crystal display device and fabricating method thereof, by which domain failure (alignment failure) can be previously repaired by a mother substrate unit by adding a step of cooling a thermoset substrate rapidly prior to cutting. The present invention includes a vacuum alignment equipment assembling a first mother substrate having either liquid crystals dropped thereon or a sealant formed thereon and a second mother substrate having either the sealant formed thereon or the liquid crystals therein, a UV-sealant hardener performing UV-hardening on the sealant of the assembled substrates, a thermosetter thermosetting the UV-hardened substrates, a rapid cooler rapidly cooling the thermoset substrates, and a cutter cutting the rapidly cooled substrates into a plurality of unit liquid crystal display panels.

21 Claims, 7 Drawing Sheets

U.S. PATENT DOCUMENTS

| | | | |
|---|---|---|---|
| 5,621,553 A * | 4/1997 | Nishiguchi et al. | 349/153 |
| 5,642,214 A | 6/1997 | Ishii | |
| 5,680,189 A | 10/1997 | Shimizu et al. | |
| 5,742,370 A | 4/1998 | Kim | |
| 5,757,451 A | 5/1998 | Miyazaki | |
| 5,764,314 A * | 6/1998 | Narayan et al. | 349/58 |
| 5,852,484 A | 12/1998 | Inoue et al. | |
| 5,854,664 A | 12/1998 | Inoue et al. | |
| 5,861,932 A | 1/1999 | Inata | |
| 5,875,922 A | 3/1999 | Chastine et al. | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,355,125 B1 * | 3/2002 | Tahon et al. | 156/99 |
| 6,414,733 B1 | 7/2002 | Ishikawa | |

FOREIGN PATENT DOCUMENTS

| | | | |
|---|---|---|---|
| EP | 1 003 066 A1 | 5/2000 | |
| JP | 51-65656 | 6/1976 | |
| JP | 57-038414 | 3/1982 | |
| JP | 57-088428 | 6/1982 | |
| JP | 58-027126 | 2/1983 | |
| JP | 59-057221 | 4/1984 | |
| JP | 59-195222 | 11/1984 | |
| JP | 60-111221 | 6/1985 | |
| JP | 60-164723 | 8/1985 | |
| JP | 60-217343 | 10/1985 | |
| JP | 61-007822 | 1/1986 | |
| JP | 61-055625 | 3/1986 | |
| JP | S62-054225 | 3/1987 | |
| JP | S62-054228 | 3/1987 | |
| JP | 62-089025 | 4/1987 | |
| JP | 62-090622 | 4/1987 | |
| JP | 62-205319 | 9/1987 | |
| JP | 63-109413 | 5/1988 | |
| JP | 63-110425 | 5/1988 | |
| JP | 63-128315 | 5/1988 | |
| JP | 63-311233 | 12/1988 | |
| JP | H03-009549 | 1/1991 | |
| JP | H05-036425 | 2/1993 | |
| JP | H05-036426 | 2/1993 | |
| JP | H05-107533 | 4/1993 | |
| JP | 05-127179 | 5/1993 | |
| JP | 05-154923 | 6/1993 | |
| JP | 05-265011 | 10/1993 | |
| JP | 05-281557 | 10/1993 | |
| JP | 05-281562 | 10/1993 | |
| JP | H06-018829 | 1/1994 | |
| JP | 06-051256 | 2/1994 | |
| JP | H06-064229 | 3/1994 | |
| JP | 06-148657 | 5/1994 | |
| JP | 06-160871 | 6/1994 | |
| JP | H06-194637 | 7/1994 | |
| JP | 06-235925 | 8/1994 | |
| JP | 06-265915 | 9/1994 | |
| JP | 06-313870 | 11/1994 | |
| JP | 07-084268 | 3/1995 | |
| JP | 07-128674 | 5/1995 | |
| JP | 07-181507 | 7/1995 | |
| JP | H07-275770 | 10/1995 | |
| JP | H07-275771 | 10/1995 | |
| JP | 07-318952 | * 12/1995 | |
| JP | H08-076133 | 3/1996 | |
| JP | 08-095066 | 4/1996 | |
| JP | 08-101395 | 4/1996 | |
| JP | 08-106101 | 4/1996 | |
| JP | H08-110504 | 4/1996 | |
| JP | H08-136937 | 5/1996 | |
| JP | 08-171094 | 7/1996 | |
| JP | 08-190099 | 7/1996 | |
| JP | H08-173874 | 7/1996 | |
| JP | 08-240807 | 9/1996 | |
| JP | 09-005762 | 1/1997 | |
| JP | 09-026578 | 1/1997 | |
| JP | H09-001026 | 1/1997 | |
| JP | 09-311340 | 2/1997 | |
| JP | 09-61829 | 3/1997 | |
| JP | 09-073075 | 3/1997 | |
| JP | 09-073096 | 3/1997 | |
| JP | H09-094500 | 4/1997 | |
| JP | 09-127528 | 5/1997 | |
| JP | 09-230357 | 9/1997 | |
| JP | 09-281511 | 10/1997 | |
| JP | 10-123537 | 5/1998 | |
| JP | 10-123538 | 5/1998 | |
| JP | 10-142616 | 5/1998 | |
| JP | 10-177178 | 6/1998 | |
| JP | H10-174924 | 6/1998 | |
| JP | 10-221700 | 8/1998 | |
| JP | 10-282512 | 10/1998 | |
| JP | 10-333157 | 12/1998 | |
| JP | 10-333159 | 12/1998 | |
| JP | 11-014953 | 1/1999 | |
| JP | 11-038424 | 2/1999 | |
| JP | 11-064811 | 3/1999 | |
| JP | 11-109388 | 4/1999 | |
| JP | 11-133438 | 5/1999 | |
| JP | 11-142864 | 5/1999 | |
| JP | 11-174477 | 7/1999 | |
| JP | 11-212045 | 8/1999 | |
| JP | 11-248930 | 9/1999 | |
| JP | H11-262712 | 9/1999 | |
| JP | H11-264991 | 9/1999 | |
| JP | 11-326922 | 11/1999 | |
| JP | 11-344714 | 12/1999 | |
| JP | 2000-002879 | 1/2000 | |
| JP | 2000-029035 | 1/2000 | |
| JP | 2000-056311 | 2/2000 | |
| JP | 2000-066165 | 3/2000 | |
| JP | 2000-066218 | 3/2000 | |
| JP | 2000-093866 | 4/2000 | |
| JP | 2000-137235 | 5/2000 | |
| JP | 2000-147528 | 5/2000 | |
| JP | 2000-193988 | 7/2000 | |
| JP | 2000-241824 | 9/2000 | |
| JP | 2000-284295 | 10/2000 | |
| JP | 2000-292799 | 10/2000 | |
| JP | 2000-310759 | 11/2000 | |
| JP | 2000-310784 | 11/2000 | |
| JP | 2000-338501 | 12/2000 | |
| JP | 2001-005401 | 1/2001 | |
| JP | 2001-005405 | 1/2001 | |
| JP | 2001-013506 | 1/2001 | |
| JP | 2001-033793 | 2/2001 | |
| JP | 2001-042341 | 2/2001 | |
| JP | 2001-051284 | 2/2001 | |
| JP | 2001-066615 | 3/2001 | |
| JP | 2001-091727 | 4/2001 | |
| JP | 2001-117105 | 4/2001 | |
| JP | 2001-117109 | 4/2001 | |
| JP | 2001-133745 | 5/2001 | |
| JP | 2001-133794 | 5/2001 | |

| | | | | | |
|---|---|---|---|---|---|
| JP | 2001-133799 | 5/2001 | JP | 2002-122873 | 4/2002 |
| JP | 2001-142074 | 5/2001 | JP | 2002-131762 | 5/2002 |
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-258299 | 8/2002 |
| JP | 2001-215459 | 8/2001 | JP | 2002-236292 | 9/2002 |
| JP | 2001-222017 | 8/2001 | JP | 2002-277865 | 9/2002 |
| JP | 2001-235758 | 8/2001 | JP | 2002-277866 | 9/2002 |
| JP | 2001-255542 | 9/2001 | JP | 2002-277881 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-323687 | 11/2002 |
| JP | 2001-330837 | 11/2001 | JP | 2002-323694 | 11/2002 |
| JP | 2001-330840 | 11/2001 | JP | 2002-333628 | 11/2002 |
| JP | 2001-356353 | 12/2001 | JP | 2002-333635 | 11/2002 |
| JP | 2001-356354 | 12/2001 | JP | 2002-333843 | 11/2002 |
| JP | 2002-014360 | 1/2002 | JP | 2002-341329 | 11/2002 |
| JP | 2002-023176 | 1/2002 | JP | 2002-341355 | 11/2002 |
| JP | 2002-049045 | 2/2002 | JP | 2002-341356 | 11/2002 |
| JP | 2002-079160 | 3/2002 | JP | 2002-341357 | 11/2002 |
| JP | 2002-080321 | 3/2002 | JP | 2002-341358 | 11/2002 |
| JP | 2002-082340 | 3/2002 | JP | 2002-341359 | 11/2002 |
| JP | 2002-090759 | 3/2002 | JP | 2002-341362 | 11/2002 |
| JP | 2002-090760 | 3/2002 | KR | 1995-33588 | * 12/1995 |
| JP | 2002-107740 | 4/2002 | KR | 2000-0035302 | 6/2000 |
| JP | 2002-122870 | 4/2002 | | | |
| JP | 2002-122872 | 4/2002 | | | |

* cited by examiner

MANUFACTURING LINE OF LIQUID CRYSTAL DISPLAY DEVICE AND FABRICATING METHOD THEREOF

This application claims the benefit of Korean Application No. P2003-97617 filed on Dec. 26, 2003, which is hereby incorporated by reference for all purposes as if fully set forth herein.

This application incorporates by reference two applications Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" as if fully set forth herein.

BACKGROUND OF THE INVENTION

1. Field of the Invention

The present invention relates to a method of fabricating a liquid crystal display device, and more particularly, to a manufacturing line of a liquid crystal display device using a drop-filling and fabricating method thereof, by which liquid crystal alignment failure can be repaired.

2. Discussion of the Related Art

As information society rapidly develops, the demand for a display technology is increasing in various ways. A variety of flat display devices are designed to meet such a demand and many efforts are made to develop such a flat display device as LCD (liquid crystal display device), PDP (plasma display panel), ELD (electroluminescent display), VFD (vacuum fluorescent display), and the like. Some of the flat display devices are already applicable to various equipments.

By replacing CRT (cathode ray tube), which cannot be used as mobile image display devices, LCDs provide excellent features including excellent image quality, lightweight, compact size, and low power consumption, thereby becoming the most popular device of the various flat display devices. Moreover, LCDs are also applicable as a TV set to receive and display broadcast signals, a computer monitor, and the like, as well as a portable notebook computer monitor.

A liquid crystal display device mainly consists of a liquid crystal display panel and a drive unit applying a drive signal to the liquid crystal display panel. The liquid crystal display panel consists of first and second glass substrates assembled to each other to leave a predetermined distance from each other, and a liquid crystal layer injected between the first and second glass substrates.

A plurality of gate lines arranged in one direction with a predetermined distance therebetween, a plurality of data lines arranged with a predetermined interval therebetween in a direction perpendicular to the respective gate lines, a plurality of pixel electrodes formed in pixel areas provided by the crossing of the gate and data lines, respectively, and a plurality of thin film transistors for transferring signals of the data lines to the corresponding pixel electrodes by being switched by signals of the gate lines, respectively are formed on the first glass substrate (TFT array substrate).

A black matrix layer enabling light to be transmitted to the pixel areas only, an R/G/B color filter layer, and a common electrode for implementing an image are formed on the second glass substrate (color filter substrate).

The first and second glass substrates, between which a predetermined space is provided by spacers, are assembled to each other by a sealant having a liquid crystal inlet. Liquid crystals are then injected in the predetermined space via the liquid crystal injection inlet.

In doing so, when the liquid crystal inlet is dipped in liquid crystals while a vacuum state of the predetermined space is maintained, liquid crystals are injected between the two substrates by an osmotic action. After completion of the liquid crystal injection, the liquid crystal inlet is sealed with a sealant.

However, the related art fabricating method of an injection type liquid crystal display device has the following disadvantages or problems.

First, after completion of cutting into unit panels, the vacuum state of the gap between the two substrates needs to be maintained to inject liquid crystals therein by dipping the liquid crystal inlet in the liquid crystals. Hence, the liquid crystal injection takes a considerably long time to reduce productivity.

Secondly, in case of fabricating a wide liquid crystal display device, the liquid crystal injection method may not completely fill the liquid crystal panel with liquid crystals which causes failure of the device.

Thirdly, the corresponding process is complicated and requires quite a long processing time. The corresponding process requires various liquid crystal injection equipment, which occupies an excessive installation space.

Hence, much research and development has been directed to a method of fabricating a liquid crystal display device using drop-filling.

A method of fabricating a liquid crystal display device using drop-filling according to a related art is explained as follows.

Figure 1:
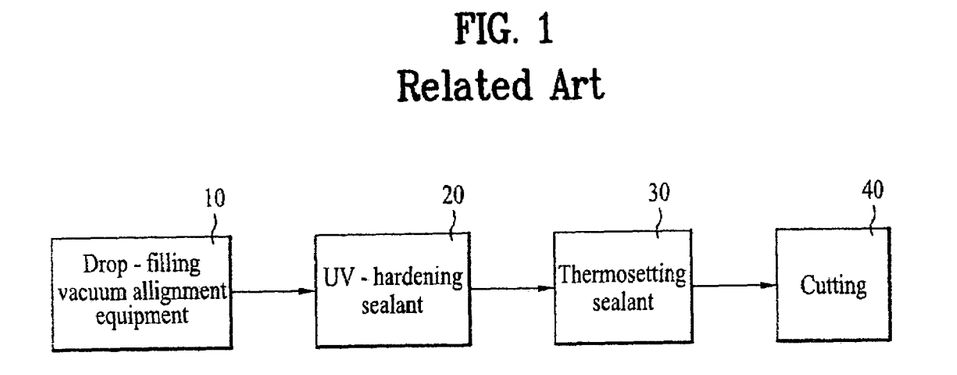
FIG. 1 is a block diagram of a process line using liquid crystal drop-filling according to a related art.

FIG. 1 is a block diagram of a process line using liquid crystal drop-filling according to a related art, and FIGS. 2A to 2E are cross-sectional diagrams of a method of fabricating a liquid crystal display device using drop-filling according to a related art.

First, in a method of fabricating a liquid crystal display device using drop-filling, instead of forming one liquid crystal display panel on one glass substrate, a plurality of liquid crystal display panels are preferably designed on a mother substrate greater than one unit liquid crystal display panel. A thin film transistor array is formed on each liquid crystal display panel area on a first mother substrate, and a color filter array is formed on each liquid crystal display panel area on a second mother substrate.

An alignment layer for liquid crystal alignment is formed on each of the first and second mother substrates. Rubbing is then performed on the alignment layer. Liquid crystals are dropped on the corresponding liquid crystal display panel areas of the first or second mother substrate. A sealant and Ag dots are dispensed on a periphery of the liquid crystal display panel area. The first and second mother substrates are then assembled to each other. The assembled substrates are cut into unit liquid crystal display panels to be processed.

Namely, a manufacturing line for drop-filling according to a related art, as illustrated in FIG. 1, includes vacuum alignment equipment 10 for assembling a first mother substrate having thin film transistor arrays and a second mother substrate having color filter arrays in a vacuum state after completion of liquid crystal dropping and sealant coating thereon, a UV sealant hardener 20 for hardening the sealant between the assembled substrates by UV-hardening, thermosetting equipment 30 for thermosetting the UV hardened substrates, and a cutter 40 for cutting the thermoset substrates into unit liquid crystal display panels.

A process carried out in the vacuum alignment equipment 10 is explained in detail by referring to FIGS. 2A to 2E as follows.

Figure 2A:
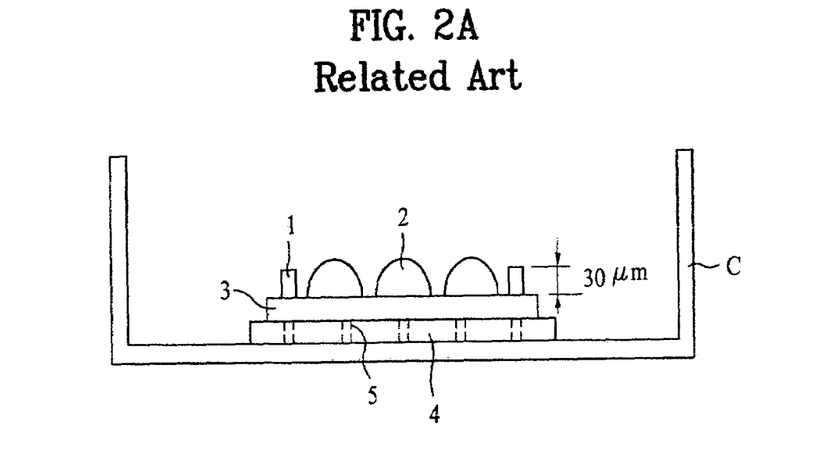
FIGS. 2A to 2E are cross-sectional diagrams of a process of fabricating a liquid crystal display device using drop-filling according to a related art.

In FIG. 2A, a UV-hardening sealant 1 is coated about 30 μm thick on a portion of a first glass substrate 3 having thin film transistor arrays formed thereon. Liquid crystals 2 are dropped on the first glass substrate 3 inside a border formed by the sealant 1 (over the thin film transistor arrays). In coating the sealant 1, no liquid crystal inlet is provided to the sealant 1.

The first glass substrate 3 is loaded on a horizontally movable table 4 within a vacuum chamber 'C'. A lower surface of the first glass substrate 3 is held by a first vacuum holder 5 using vacuum suction to be fixed thereto.

Figure 2B:
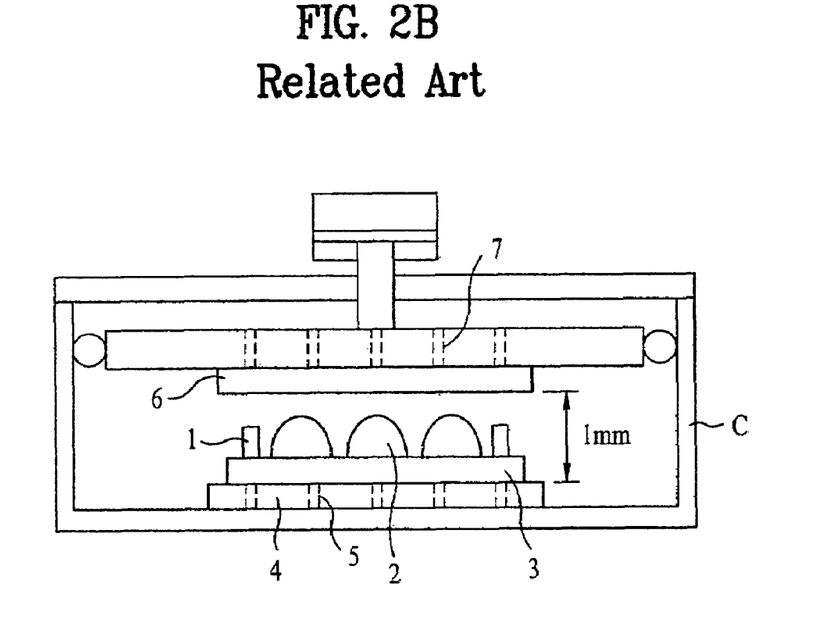

Referring to FIG. 2B, a lower surface of a second glass substrate 6 having color filter arrays formed thereon is held by a second vacuum holder 7 using vacuum suction to be fixed thereto. The vacuum chamber 'C' is then closed to provide a vacuum state therein. The second vacuum holder 7 is vertically lowered to leave a distance of 1 mm from the first glass substrate 3. The table 4 having the first glass substrate 3 loaded thereon is horizontally moved to preliminarily align the first and second glass substrates 3 and 6.

Figure 2C:
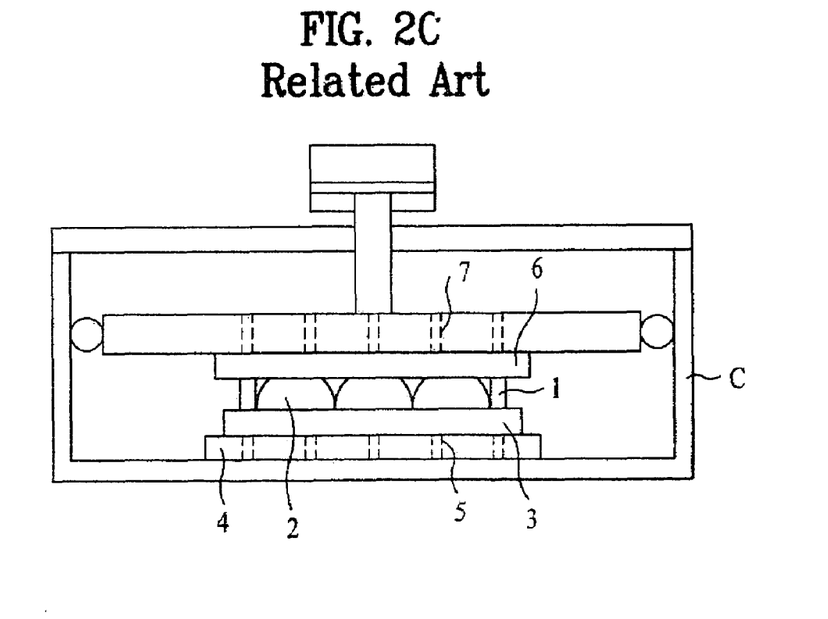

Referring to FIG. 2C, the second vacuum holder 7 is vertically lowered to contact the second glass substrate 6 with the liquid crystals 2 or sealant 1.

Figure 2D:
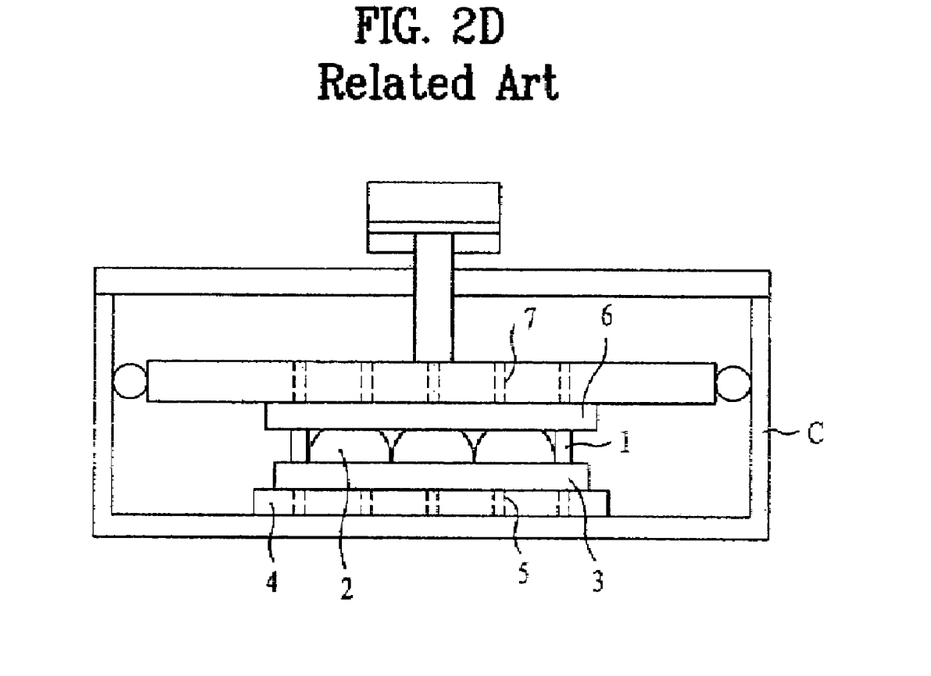
Figure 2E:
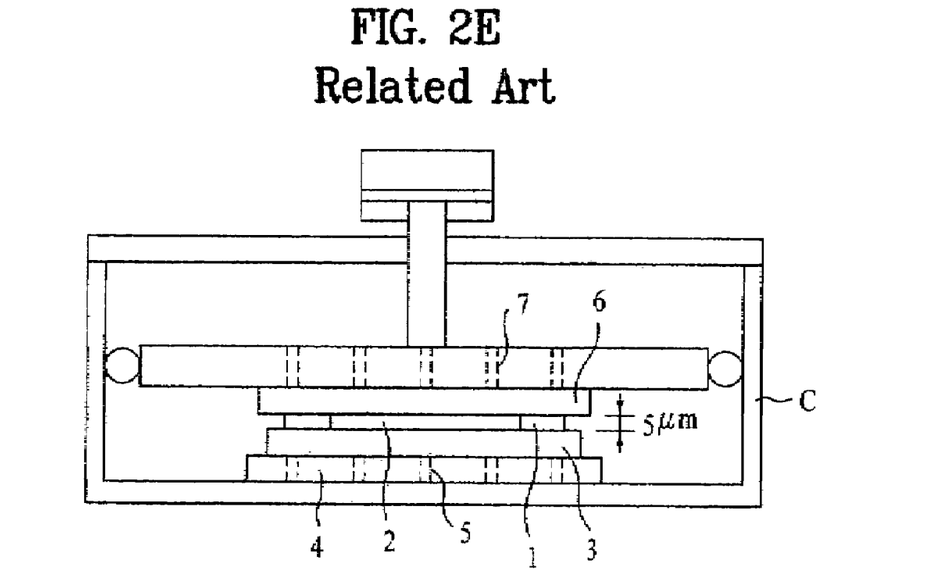

Referring to FIG. 2D, the second vacuum holder 7 is vertically lowered so that the second glass substrate 6 is attached to the first glass substrate 3 via the sealant 1. A illustrated in FIG. 2E, the second glass substrate 6 is pressurized to leave a distance of 5 μm from the first glass substrate 3.

The assembled substrates are taken out of the vacuum alignment equipment 10 and are then transferred to the UV-sealant hardener 20. A masking is formed on the assembled substrates to expose the sealant 1 only. UV light is applied to the sealant 1 only to perform a first hardening on the sealant 1.

The assembled substrates are moved to the thermosetting equipment 30 from the UV-sealant hardener 20. The sealant 1 is then thermoset for about 60 minutes at 120° C. in the thermosetting equipment 30.

The assembled substrates are then transferred to the cutter 40 to be cut into a plurality of unit liquid crystal display panels. Although not shown in the drawings, the unit liquid crystal display panels are then further processed by other processing equipment. A test process is also performed on the processed panels by test equipment.

By the test process, various characteristics of the liquid crystal display panel are checked. In doing so, a domain failure (alignment failure) is checked. Namely, in the rubbing process, a surface of the alignment layer formed on the substrate is rubbed by a rubbing cloth that rotates at a uniform pressure and speed so that polymer chains on the surface of the alignment layer can be aligned in one direction to determine an alignment direction of liquid crystal molecules. In doing so, the alignment direction of one portion having a weak alignment force deviates at a different angle from that of the other portion, whereby the domain failure takes place.

Hence, a worker manually sorts the liquid crystal display panel. After aging has been performed on the sorted panel, the aged panel is put on an iron plate to be rapidly cooled. And, the domain failure is checked again.

However, the related art method of fabricating the liquid crystal display device using drop-filling has the following problem or disadvantage.

First of all, after the assembled substrate have been cut into the unit liquid crystal display panels, each of the unit liquid crystal display panels is tested by a worker. If the domain failure is found, the worker manually sorts the domain-failing liquid crystal display panel. After aging has been performed on the sorted panel, the aged panel is put on an iron plate to be rapidly cooled. And, the domain failure is checked again. Such a process is repeated until the domain failure is overcome.

Hence, the domain failure test is performed on each liquid crystal display panel, thereby needing a long test time and more manpower.

SUMMARY OF THE INVENTION

Accordingly, the present invention is directed to a manufacturing line of a liquid crystal display device and fabricating method thereof that substantially obviate one or more problems due to limitations and disadvantages of the related art.

An advantage of the present invention is to provide a manufacturing line of a liquid crystal display device and fabricating method thereof by which domain failure (alignment failure) can be previously repaired by a mother substrate unit by adding a step of cooling a thermoset substrate rapidly prior to cutting.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a manufacturing line of a liquid crystal display device according to the present invention includes a vacuum alignment equipment assembling a first mother substrate having either liquid crystals dropped thereon or a sealant formed thereon and a second mother substrate having either the sealant formed thereon or the liquid crystals thereon, a UV-sealant hardener performing UV-hardening on the sealant of the assembled substrates, a thermosetter thermosetting the UV-hardened substrates, a rapid cooler rapidly cooling the thermoset substrates, and a cutter cutting the rapidly cooled substrates into a plurality of unit liquid crystal display panels.

Preferably, the rapid cooler includes a cooling table provided with an internal space for a coolant flow to have the thermoset substrates loaded thereon, a coolant inlet part at one side of the cooling table to supply the coolant to the cooling table, and a coolant outlet part for discharging the coolant from the cooling table.

In another aspect of the present invention, a method of fabricating a liquid crystal display device includes the steps of preparing a first mother substrate having a plurality of thin film transistor arrays formed in a plurality of panel areas, respectively and a second mother substrate having a plurality of color filter arrays formed in a plurality of the panel areas, respectively, dropping a predetermined amount of liquid crystals in each of the panel areas of the first or second mother substrate and coating a sealant on each of the panel areas of the second or first mother substrate, assembling the first and second mother substrates, UV-hardening the sealant between the assembled mother substrates, thermosetting the UV-hardened sealant, cooling the thermoset mother substrates rapidly, and cutting the rapidly cooled mother substrates into a plurality of unit liquid crystal display panels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 3:
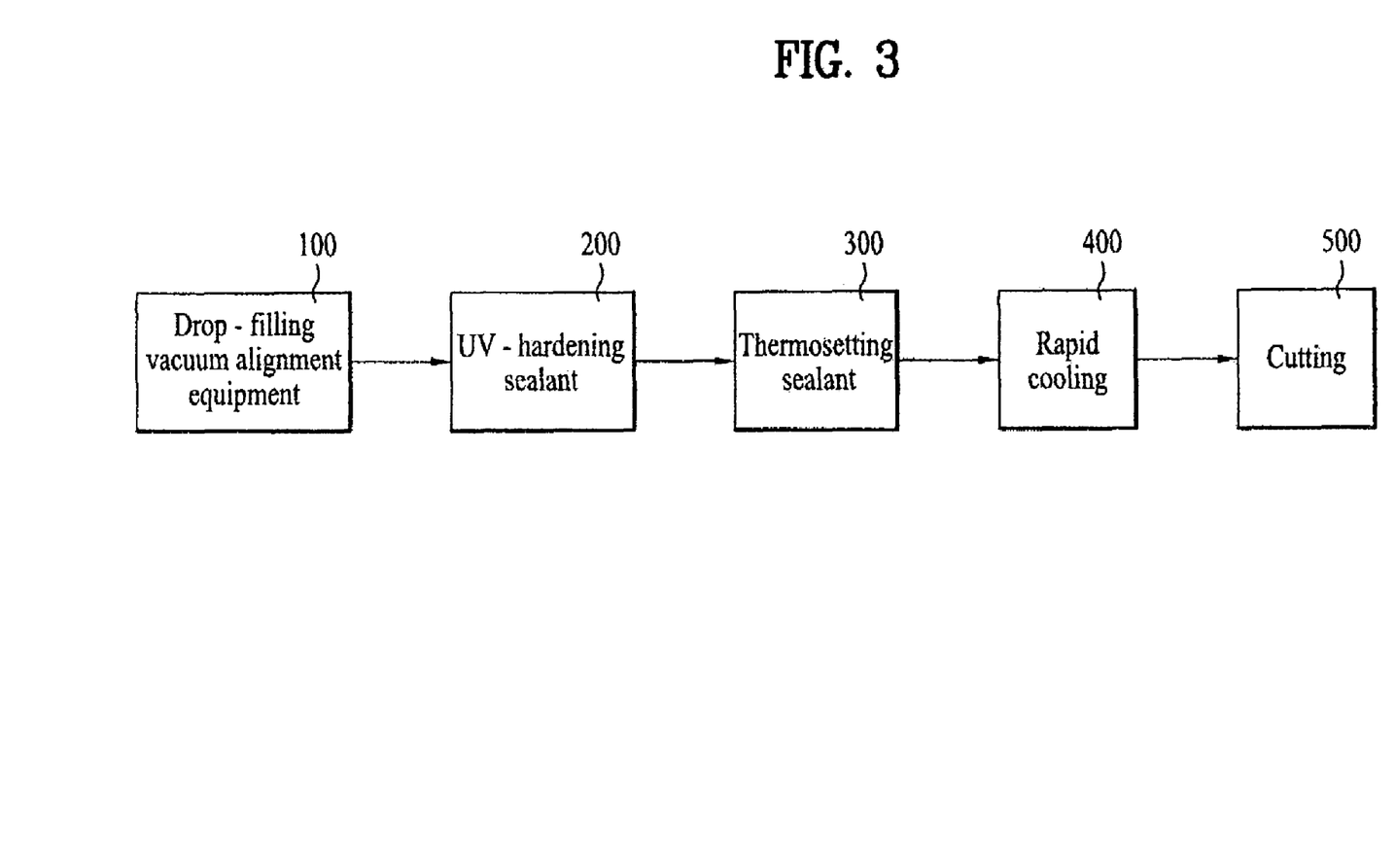
FIG. 3 is a block diagram of a manufacturing line of a drop-filling type liquid crystal display device according to the present invention.
Figure 4:
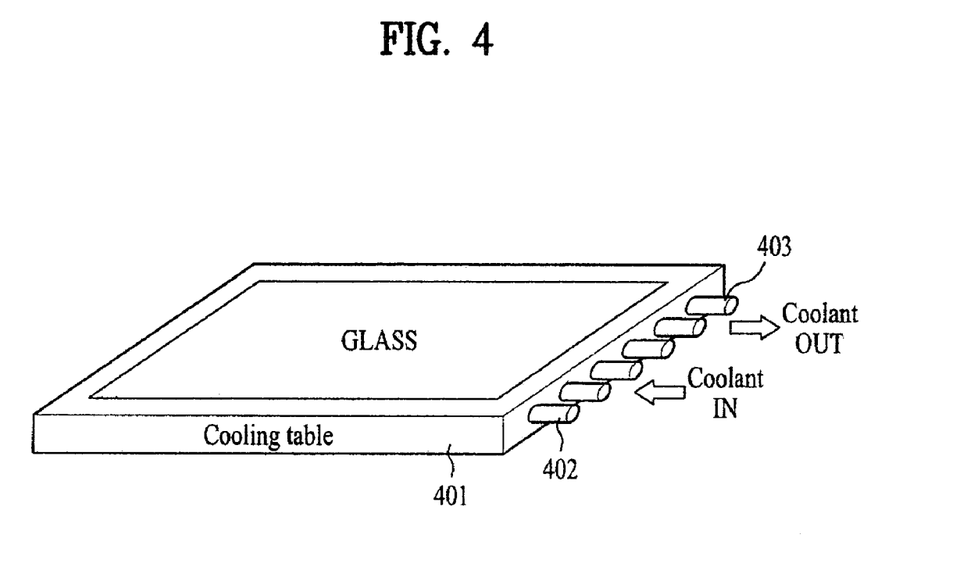
FIG. 4 is a perspective diagram of a rapid cooling equipment according to the present invention.
Figure 5:
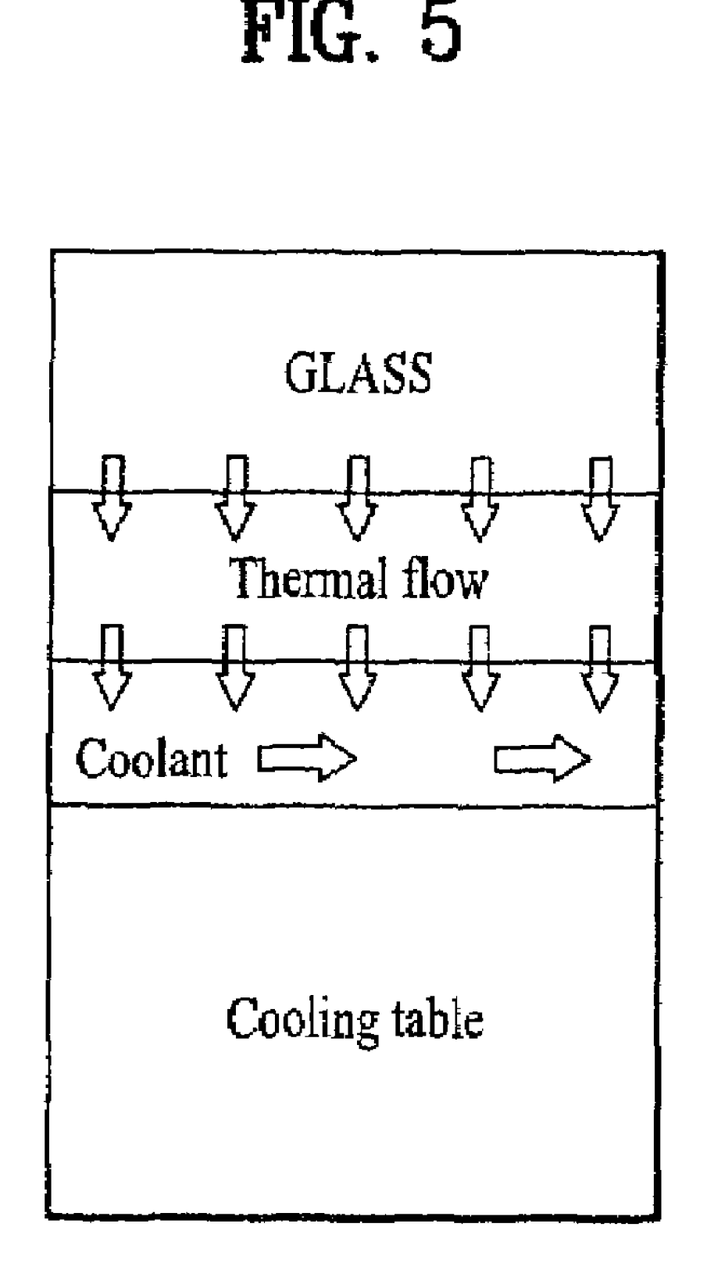
FIG. 5 is a cross-sectional diagram of the rapid cooling equipment in FIG. 4.

FIG. 3 is a block diagram of a manufacturing line of a drop-filling type liquid crystal display device according to the present invention, FIG. 4 is a perspective diagram of a rapid cooling equipment according to the present invention, and FIG. 5 is a cross-sectional diagram of the rapid cooling equipment in FIG. 4.

First of all, an alignment layer is formed on each of a first mother substrate having thin film transistor arrays formed on panel areas, respectively, and a second mother substrate having color filter arrays formed on panel areas, respectively. Rubbing is performed on the alignment layer.

A predetermined amount of liquid crystals is dropped on each of the panel areas of the first or second mother substrate. A sealant is coated on the corresponding mother substrate. Thus, the first and second mother substrates are prepared to be assembled.

A manufacturing line of a drop-filling type liquid crystal display device according to the present invention, as illustrated in FIG. 3, includes vacuum alignment equipment 100 for assembling the first and second mother substrates in a vacuum state, a UV-sealant hardener 200 for performing UV-hardening on the sealant of the assembled substrates, a thermosetter 300 for thermosetting the UV-hardened substrates, a rapid cooler 400 for rapidly cooling the thermoset substrates, and a cutter 500 for cutting the rapidly cooled substrates into a plurality of unit liquid crystal display panels.

The rapid cooler 400, as illustrated in FIG. 4 and FIG. 5, includes a cooling table 401 provided with an internal space for a coolant flow to have the thermoset substrates loaded thereon, a coolant inlet part 402 at one side of the cooling table 401 to supply the coolant to the cooling table 401, and a coolant outlet part 403 for discharging the coolant from the cooling table 401.

A method of fabricating a drop-filling type liquid crystal display device according to the present invention is explained as follows.

Figure 6:
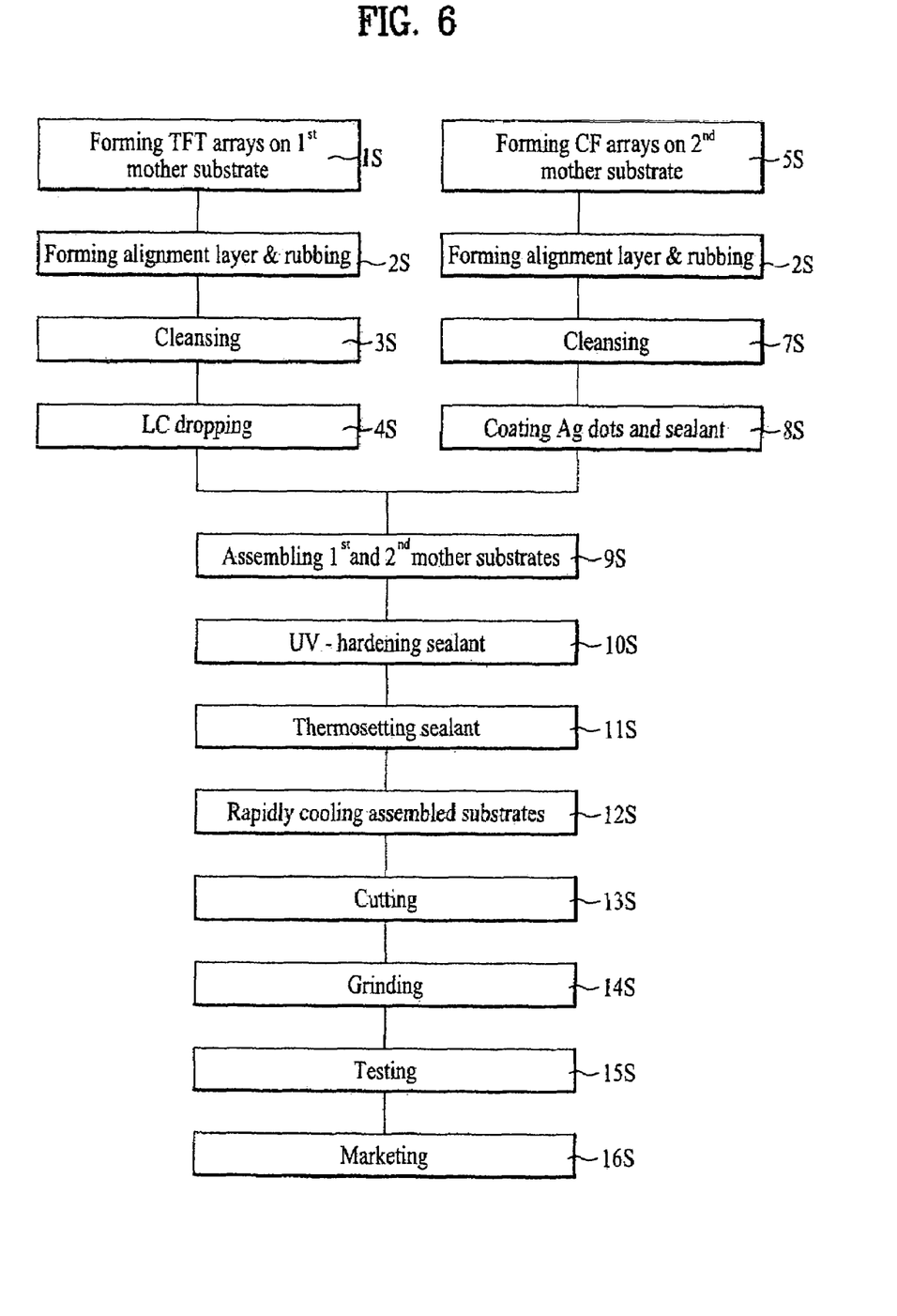
FIG. 6 is a flowchart of a method of fabricating a drop-filling type liquid crystal display device according to the present invention.

FIG. 6 is a flowchart of a method of fabricating a drop-filling type liquid crystal display device according to the present invention.

Referring to FIG. 6, a plurality of thin film transistor arrays are formed on a plurality of panel areas of a first mother substrate, respectively (1S). An alignment layer is formed on the first mother substrate and rubbing is then performed on the alignment layer (2S). Alternatively, photo-alignment can be performed on the alignment layer instead of rubbing.

Meanwhile, a plurality of color filter arrays are formed on a plurality of panel areas of a second mother substrate, respectively (5S). An alignment layer is formed on the second mother substrate and rubbing is then performed on the alignment layer (6S). Alternatively, photo-alignment can be performed on the alignment layer instead of rubbing.

Of course, spacers are provided on the first or second mother substrates to maintain a cell gap between the first and second mother substrates prior to the formation of the alignment layers.

After the first and second mother substrates have been cleansed (3S, 7S), a predetermined amount of liquid crystal is dropped on each of the panel areas of the first or second mother substrates and a sealant coating is performed on the first or second mother substrate (4S, 8S).

Namely, an appropriate amount of liquid crystals is dropped or applied on each of the liquid crystal display panel areas of the first mother substrate according to a size of the corresponding liquid crystal display panel area, and Ag dots and sealant are coated on peripheries of the respective liquid crystal display panel areas. Of course, the sealant and Ag dots can be coated on the second mother substrate and the liquid crystals can be applied on the first mother substrate.

Thus, the first and second mother substrates, on which the liquid crystals and the Ag dots and sealant are formed, are loaded on the vacuum alignment equipment 100 and are then assembled to each other to have a predetermined cell gap via the spacers (9S).

The first and second mother substrates assembling method is explained in detail as follows.

First of all, the sealant-coated second mother substrate is loaded in the vacuum alignment equipment 100 by a robot (not shown in the drawing) so that a sealant-coated side faces downward. While this state is maintained, an upper stage (not shown in the drawing) of the vacuum alignment equipment 100 is lowered. The lowered upper stage picks up the second mother substrate via vacuum suction and is then lifted upward.

The first mother substrate having liquid crystals dropped thereon is placed on a lower stage (not shown in the drawing) within the vacuum alignment equipment by the robot.

When a predetermined vacuum state is maintained within the vacuum alignment equipment 100, the upper stage is lowered to pressurize the first and second mother substrates to assemble to each other.

Thereafter, the vacuum suction power of the upper stage is released to separate the assembled substrates from the upper stage. The assembled substrates are unloaded from the vacuum alignment equipment 100.

The assembled substrates unloaded from the vacuum alignment equipment 100 are loaded on the UV-hardener 200 to UV-harden the sealant (10S).

In doing so, the sealant is first hardened in a manner of placing a mask over the substrates to expose the sealant between the assembled substrates only and applying UV light to the substrates.

Subsequently, the UV-hardened substrates are loaded in the thermosetter 300 to thermally harden the sealant (11S). In doing so, thermosetting is carried out for about 60 minutes at about 120° C., and the liquid crystals uniformly spread.

The thermoset substrates are loaded on the cooler to be rapidly cooled (12S). In doing so, even if the alignment power of a predetermined portion is weak due to the poor rubbing of the alignment layer, the alignment failure is repaired.

Namely, the liquid crystal layer is heated at high temperature during the thermosetting, the liquid crystal viscosity is lowered so that liquid crystal molecules can freely move. In the case that the substrates are rapidly cooled, for example, cooled to below approximately 30° C. in about 10-20 seconds. The free liquid crystal molecules are aligned according to the alignment direction of the alignment layer. In doing so, the liquid crystals at the portion of the weak alignment power are aligned in the same direction by the instant turning force of other liquid crystals.

Thus, the rapidly cooled mother substrates are cut into a plurality of unit liquid crystal display panels (S13). After completion of grinding (S14), the corresponding panels are finally tested (S15) to be marketed (S16).

Accordingly, a manufacturing line of a liquid crystal display device and fabricating method thereof provide the following effect or advantage.

Namely, since the heated substrates unloaded from the thermosetter are put on the cooler to be rapidly cooled, the domain failure can be repaired by substrate unit without worker's manual handling. Therefore, the present invention saves time and manpower.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A manufacturing line of a liquid crystal display device, comprising:
   a vacuum alignment equipment for assembling a first mother substrate having either liquid crystals dropped thereon or a sealant formed thereon and a second mother substrate having either the sealant formed thereon or the liquid crystals thereon;
   a UV-sealant hardener for UV-hardening the sealant of the assembled mother substrates;
   a thermosetter for thermosetting the UV-hardened mother substrates;
   a cooler for rapidly cooling the thermoset mother substrates to repair an alignment failure; and
   a cutter for cutting the cooled mother substrates into a plurality of unit liquid crystal display panels.

2. The manufacturing line of claim 1, further comprising a tester for testing the cut unit liquid crystal display panels.

3. The manufacturing line of claim 1, the cooler comprising:
   a cooling table provided with an internal space for a coolant flow to have the thermoset mother substrates loaded thereon;
   a coolant inlet part at one side of the cooling table to supply the coolant to the cooling table; and
   a coolant outlet part for discharging the coolant from the cooling table.

4. A method of fabricating a liquid crystal display device, comprising:
   preparing a first mother substrate having a plurality of thin film transistor arrays formed in a plurality of panel areas, respectively and a second mother substrate having a plurality of color filter arrays formed in a the plurality of panel areas, respectively;
   applying a predetermined amount of liquid crystals in each of the plurality of panel areas of the first or second mother substrate and coating a sealant on each of the plurality of panel areas of the second or first mother substrate;
   assembling the first and second mother substrates;
   UV-hardening the sealant between the assembled mother substrates;
   thermosetting the UV-hardened sealant;
   rapidly cooling the thermoset mother substrates to repair an alignment failure; and
   cutting the cooled mother substrates into a plurality of unit liquid crystal display panels.

5. The method of claim 4, further comprising testing the cut unit liquid crystal display panels.

6. The method of claim 4, wherein the cooling is performed using a cooling table provided with an internal space for a coolant flow to have the thermoset mother substrates loaded thereon; a coolant inlet part at one side of the cooling table to supply the coolant to the cooling table; and a coolant outlet part for discharging the coolant from the cooling table.

7. The method of claim 4, wherein the thermosetting is performed at a temperature above 80° C.

8. The method of claim 7, wherein the thermosetting is performed for about 40-60 minutes.

9. The method of claim 4, wherein the cooling is performed at a temperature below approximately 30° C.

10. The method of claim 4, wherein the cooling is performed for about 5-20 seconds.

11. The method of claim 4, wherein cooling the thermoset mother substrates includes rapidly cooling the thermoset mother substrates to repair an alignment failure by aligning liquid crystals at a weakly aligned portion by the instant turning force of other liquid crystals.

12. A method of fabricating a liquid crystal display device, comprising:
   preparing a first substrate and a second substrate, the first or second substrate including a liquid crystal thereon and a the first or second substrate including a sealant thereon;
   assembling the first and second substrates with the sealant;
   curing the sealant;
   rapidly cooling the cured substrates to repair an alignment failure; and
   cutting the cooled substrates into a plurality of unit liquid crystal display panels.

13. The method of claim 12, wherein the step of curing the sealant comprises:
   UV-hardening the sealant between the assembled first and second substrates; and
   thermosetting the UV-hardened sealant.

14. The method of claim 13, wherein the thermosetting is performed at a temperature above 80° C.

15. The method of claim 13, wherein the thermosetting is performed for about 40-60 minutes.

16. The method of claim 12, further comprising:
forming an alignment layer on at least one of the first and second substrates.

17. The method of claim 12, wherein the cooling is performed at a temperature below approximately 30° C.

18. The method of claim 12, wherein the cooling is performed for about 5-20 seconds.

19. The method of claim 13, wherein cooling the cured substrates includes rapidly cooling the cured substrates to repair an alignment failure by aligning liquid crystals at a weakly aligned portion by the instant turning force of other liquid crystals.

20. A method of fabricating a liquid crystal display device, comprising:

preparing a first substrate and a second substrate, the first or second substrate including a liquid crystal thereon and the first or second substrate including a sealant thereon;

assembling the first and second substrates with the sealant;

curing the sealant;

repairing an alignment failure of the cured substrates; and cutting the repaired substrates into a plurality of unit liquid crystal display panels.

21. The method of claim 20, wherein repairing an alignment failure of the cured substrates includes rapidly cooling the cured substrates to repair an alignment failure by aligning liquid crystals at a weakly aligned portion by the instant turning force of other liquid crystals.

* * * * *